United States Patent [19]

Kataoka

[11] 4,393,839
[45] Jul. 19, 1983

[54] SYSTEM FOR CONTROLLING AN AIR-FUEL RATIO

[75] Inventor: Ryuji Kataoka, Tokyo, Japan

[73] Assignees: Fuji Jukogyo Kabushiki Kaisha, Tokyo; Nissan Motor Co., Ltd., Yokohama, both of Japan

[21] Appl. No.: 174,372

[22] Filed: Aug. 1, 1980

[30] Foreign Application Priority Data

Aug. 2, 1979 [JP] Japan .................................. 54-98919

[51] Int. Cl.³ ............................................. F02M 7/12
[52] U.S. Cl. ....................................... 123/440; 60/276
[58] Field of Search ....................... 123/493, 440, 489; 60/276, 285

[56] References Cited

U.S. PATENT DOCUMENTS

| | | | |
|---|---|---|---|
| 3,916,170 | 10/1975 | Norimatsu et al. | 123/493 |
| 4,089,313 | 5/1978 | Asano et al. | 123/493 |
| 4,119,072 | 10/1978 | Asano | 123/440 |
| 4,132,199 | 1/1979 | Kuroiwa et al. | 60/276 |
| 4,143,623 | 3/1979 | Norimatsu et al. | 123/489 |
| 4,285,319 | 8/1981 | Hattori et al. | 123/489 |

*Primary Examiner*—Charles J. Myhre
*Assistant Examiner*—Andrew M. Dolinar
*Attorney, Agent, or Firm*—Martin A. Farber

[57] ABSTRACT

A method and system for controlling the air-fuel ratio for a carburetor for an internal combustion engine having an intake passage, an exhaust passage, a throttle valve, a detector for detecting the concentration of a constituent of the exhaust gases, an on-off type electromagnetic valve for correcting the air-fuel ratio of the air-fuel mixture supplied by an air-fuel mixture supplier and an electronic controller. The electronic controller comprises a comparing circuit for comparing the output signal of the detector with a stoichiometric reference signal, for driving the on-off electro-magnetic valve for controlling the air-fuel ratio to a value approximating the stoichiometric air-fuel ratio. A switch connects a constant signal generating circuit to the electronic controller and renders the electronic control means non-responsive to the detector when a vacuum sensor actuates the switch during a rapid deceleration, whereby the on-off electro-magnetic valve operates by the constant signal from the constant signal generating circuit at a predetermined duty ratio to prevent an excessive enrichment of the mixture caused by misfiring.

6 Claims, 3 Drawing Figures

SYSTEM FOR CONTROLLING AN AIR-FUEL RATIO

BACKGROUND OF THE INVENTION

The present invention relates to a method and system for controlling the air-fuel ratio for an internal combustion engine emission control system with a three-way catalyst, and more particularly to a system for controlling the air-fuel ratio to a predetermined value so as to effectively operate the three-way catalyst during such a deceleration which causes misfiring for preventing deviation of the air-fuel ratio caused by the misfiring.

Such a known system is a feedback control system, in which an oxygen sensor is provided to sense the oxygen content of the exhaust gases to generate an electrical signal as an indication of the air-fuel ratio of the burned air-fuel mixture. The control system controls the air-fuel ratio of the mixture to be fed to the engine in dependency on the signal from the oxygen sensor. However, if misfiring occurs in the engine during deceleration of the vehicle, a large amount of oxygen remains in the exhaust gas. The oxygen content of the exhaust gas then approximates that of exhaust gas which is produced when a lean mixture is induced and burned in the engine. Accordingly, the oxygen sensor generates a signal like a lean mixture detection, so that the control system operates to vary the mixture to a rich air-fuel ratio. Therefore, even if the actually induced mixture is a rich or proper air-fuel ratio, the mixture is excessively enriched by the control of the system. Thus, the fuel consumption of the engine deteriorates and unburned constituents of the exhaust gases increase.

SUMMARY OF THE INVENTION

The object of the present invention is to provide a system for controlling the air-fuel ratio in which a feedback control system becomes non-responsive to the signal from the oxygen sensor upon detection of such a deceleration which causes misfiring and operates to control the air-fuel ratio to a predetermined constant value for thereby preventing an excessive rich mixture supply.

According to the present invention, there is provided in a method and system for controlling air-fuel ratio for a carburetor of an internal combustion engine having an intake passage, a throttle valve, an exhaust passage, detecting means for detecting the concentration of a constituent of the exhaust gases passing through said exhaust passage and providing a detected output signal dependent thereon, air-fuel mixture supply means, and an on-off type electro-magnetic valve for correcting the air-fuel ratio of the air-fuel mixture supplied by said air-fuel mixture supply means, the improvement comprising electronic control means comprising a comparing circuit means for comparing the detected output signal of said detecting means with a reference value corresponding to a stoichiometric air-fuel ratio value and for producing a first output signal dependent on the difference, and a driving circuit means for producing a driving output for driving said electromagnetic valve means dependent on the first output signal of said comparing circuit means for controlling the air-fuel ratio to a value approximately equal to the stoichiometric air-fuel ratio, constant signal generating circuit means for selectively operating said on-off electro-magnetic valve at a predetermined duty ratio via said driving circuit, switch means for making said electric control means non-responsive to the detected output signal from said detecting means and for operatively connecting said constant signal generating circuit means to said driving circuit, and means comprising a vacuum switch in said induction passage for sensing only such a high vacuum occurring in a rapid deceleration condition of said engine that would cause misfiring and for simultaneously producing a second output signal for actuating said switch means, whereby said driving circuit is operated by the constant signal from said constant signal generating means for driving said electro-magnetic valve means at the predetermined fixed duty ratio.

Other objects and features of the present invention will become apparent from the following description of a preferred embodiment with reference to the accompanying drawings.

DETAILED DESCRIPTION OF THE PREFERRED EMBODIMENT

Figure 1:
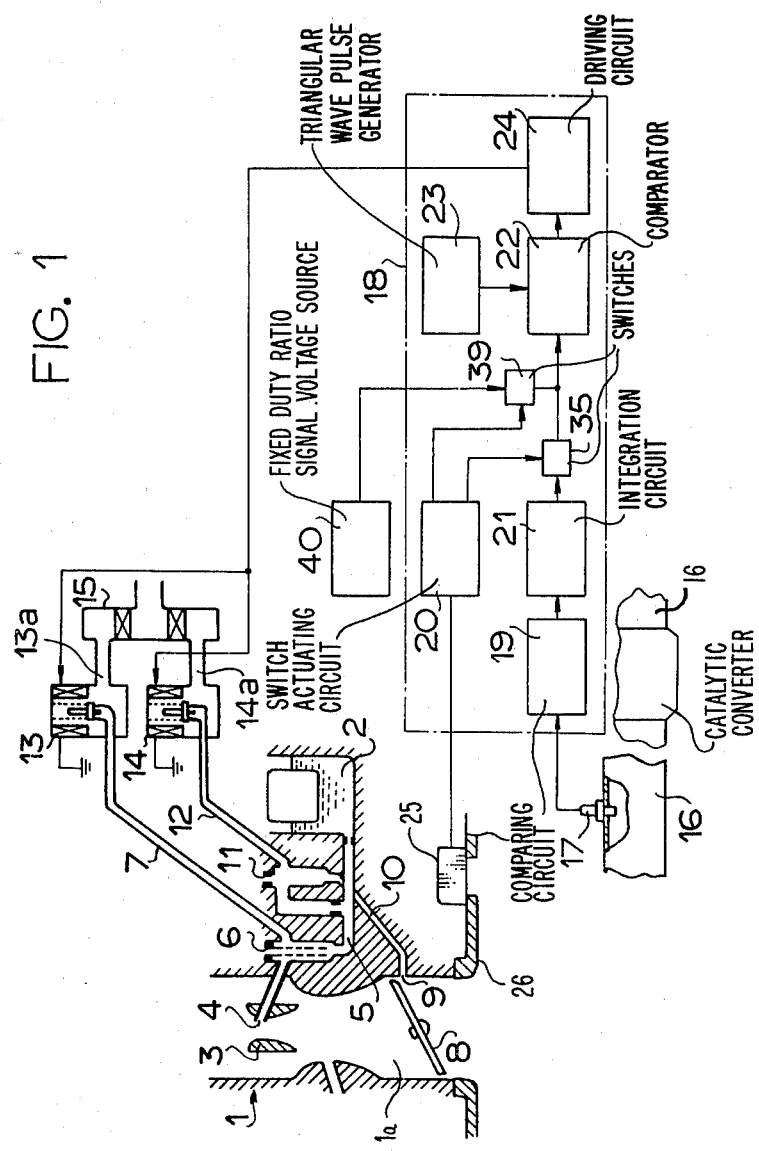
FIG. 1 is a schematic view, partially in section and partially broken-away, of a system for controlling air-fuel ratio according to the present invention.

Referring to FIG. 1, a carburetor 1 communicates with an internal combustion engine (not shown). The carburetor comprises a float chamber 2, a venturi 3 formed in an intake passage 1a, a nozzle 4 communicating with float chamber 2 through a main fuel passage 5, and a slow port 9 provided near the throttle valve 8 in the intake passage 1a and communicating with the float chamber 2 through a slow fuel passage 10. Air correcting passages 7 and 12 are provided in parallel to a main air bleed 6 and a slow air bleed 11, respectively. On-off type electromagnetic valves 13 and 14 are provided for the air correcting passages 7 and 12 respectively. Inlet port 13a and 14a of each on-off electro-magnetic valve communicates with atmosphere through an air cleaner 15. An oxygen sensor 17 is disposed in an exhaust pipe 16 which communicates with the exhaust port(s) of the engine for detecting the oxygen content of the exhaust gases therein. A three-way catalytic converter is provided in the exhaust pipe 16 downstream of the oxygen sensor 17.

The output signal of the oxygen sensor 17 is sent to a comparing circuit 19 of an electronic control circuit 18. The comparing circuit 19 compares the input signal from the oxygen sensor with a reference voltage $V_R$ (FIG. 3) corresponding to the stoichiometric air-fuel ratio and by this comparison determines whether the input signal is rich or lean compared with the voltage $V_R$ to produce a comparison signal. The comparison signal is sent to an integration circuit 21, where the signal is converted to an integration signal which varies in an opposite direction to the direction represented by the judgement signal. The integration signal is fed to a comparator circuit 22 via a switch 35. The comparator 22 compares the integration signal with triangular wave pulses applied from a triangular wave pulse generator 23 to produce square wave pulses. The square wave pulses are fed to the on-off type electromagnetic valves 13 and 14 through a driving circuit 24.

When a rich air-fuel ratio is determined in the comparing circuit 19, the comparator circuit 22 produces output pulses having a greater pulse duty ratio whereby the electro-magnetic valves 13 and 14 open for longer times during each pulse and the amount of air passing through the on-off electromagnetic valves 13 and 14 increases. Thus, the amount of air in the mixture fed from the carburetor 1 increases to thereby increase the air-fuel ratio. When a lean air-fuel ratio is determined via comparing circuit 19, an output signal having a smaller pulse duty ratio is produced whereby the air-fuel ratio is decreased to enrich the mixture.

In accordance with the present invention, a vacuum switch 25 is provided in an intake passage 26 to the engine for detecting the high vacuum which occurs in the rapid deceleration condition that can cause misfiring.

Figure 3:
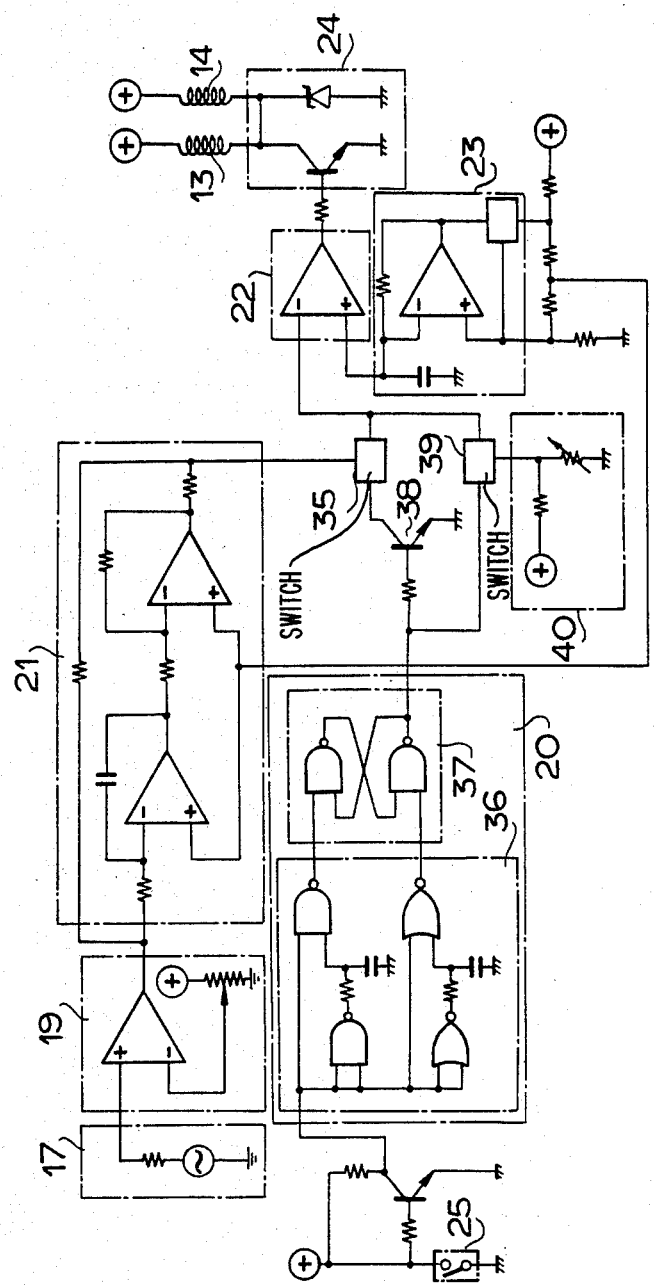
FIG. 3 shows an electronic control circuit of FIG. 1.

The vacuum switch 25 is operatively connected to a switch actuating circuit 20. As shown in FIG. 3, the switch actuating circuit 20 comprises a control circuit 36 and a R.S flip-flop 37. The output of the switch actuating circuit is connected to the gate of the switch 35 via an inverter 38 and to the gate of a switch 39. The switch 39 is provided for connecting a fixed duty ratio signal voltage source 40 to the comparator 22.

When the vacuum switch 25 is closed by the high vacuum, the output voltage of the switch actuating circuit 20 is inverted, so that the switch 35 is opened and the switch 39 is closed. Thus, the fixed duty ratio signal voltage is applied to the comparator 22. Accordingly, a signal having a proper fixed pulse duty ratio is generated from the comparator circuit 22. Thus, the on-off electromagnetic valves 13 and 14 are actuated at a predetermined proper constant pulse duty ratio.

Figure 2:
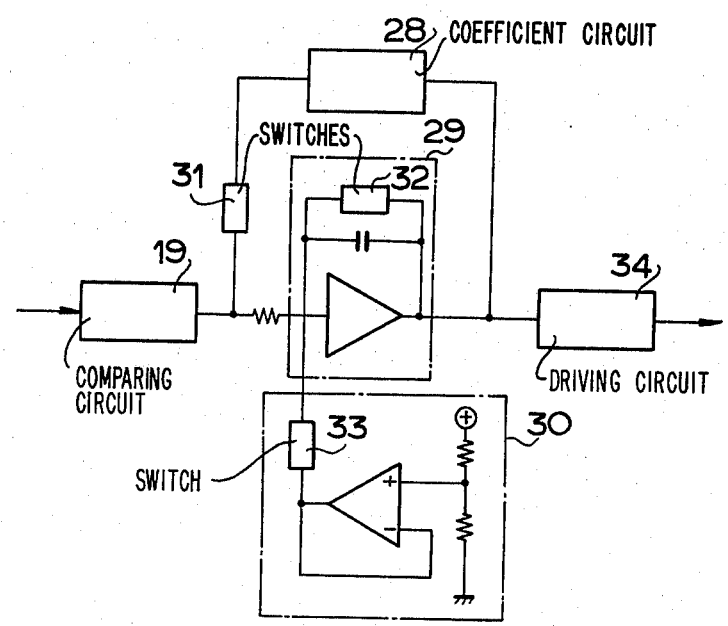
FIG. 2 is a schematic view showing a main part of another embodiment of the present invention.

Referring to FIG. 2 showing a main part of another embodiment of the present invention, the system includes a coefficient circuit 28 and an integration circuit 29 which are connected in parallel with each other, and a fixed duty ratio signal voltage generating circuit 30 connected to the integration circuit 29. The system further includes a switch 31 for connecting the coefficient circuit 28, a switch 32 for disabling the integration operation of the integration circuit 29, and a switch 33 for connecting the fixed duty ratio signal voltage generating circuit 30. Each switch is actuated by the output signal of the switch actuating circuit 20 of FIG. 1.

In the usual operation, the switch 31 is closed and switches 32 and 33 are opened. In such case the judgement signal from the comparing circuit 19 is converted to a proportional and integration signal by the coefficient circuit 28 and integration circuit 29. The signal is fed to the on-off electro-magnetic valves 13 and 14 through a driving circuit 34 for controlling the air-fuel ratio. When the vacuum switch 25 is closed, the switch 31 is opened and switches 32 and 33 are closed. Thus, the fixed duty ratio signal from the circuit 30 is fed to the electro-magnetic valves 13 and 14 through the circuit 29 and driving circuit 34. Thus, the electro-magnetic valves operates at a predetermined duty ratio.

In accordance with the present invention, since the feedback control is ineffective in a rapid deceleration condition which would cause misfiring to occur, it is possible to prevent a supply of an excessively enriched air-fuel mixture caused by the detecting signal of the oxygen sensor. Thus, the three-way catalytic converter may effectively operate to reduce the harmful constituents of the exhaust gases and fuel consumption can be improved.

What is claimed is:

1. In a system for controlling the air-fuel ratio for a carburetor of an internal combustion engine having an induction passage, a throttle valve in said induction passage, an exhaust passage, detecting means for detecting the concentration of a consistent of exhaust gases passing through said exhaust passage and providing a detecting output signal dependent thereon, air-fuel mixture supply means for supplying the air-fuel mixture to the induction passage, including an on-off type electromagnetic valve for correcting the air-fuel ratio of the air-fuel mixture supplied by said air-fuel mixture supply means, the improvement comprising a comparing circuit means for comparing the detecting output signal of said detecting means with a reference value corresponding to a stoichiometric air-fuel ratio value and for producing a first output signal dependent on the difference, an integration circuit means responsive to said first output signal for producing an integration output signal, a driving circuit means for producing a driving output for driving said type on-off type electromagnetic valve dependent on the integration output signal of said integration circuit means for controlling the air-fuel ratio to a value approximately equal to the stoichiometric air-fuel ratio, a constant signal generating circuit means for producing a constant signal selectively operating said on-off type electromagnetic valve at a predetermined duty ratio via said driving circuit means, a first switch connecting said integration circuit means with said driving circuit means, a second switch connecting said constant signal generating circuit means with said driving circuit means, means comprising a vacuum switch in said induction passage for sensing only such a high vacuum occurring in a rapid deceleration condition of said engine that would cause misfiring, and a switch actuating circuit means responsive to the output of said vacuum switch for producing a second output signal for opening said first switch and closing said second switch, said switch actuating circuit means includes a R.S. flip-flop output stage and a control circuit input stage connected to each other, whereby said driving circuit means is operated by the constant signal from said constant signal generating circuit means for driving said on-off type electromagnetic valve at said predetermined duty ratio.

2. In a system for controlling the air-fuel ratio for a carburetor of an internal combustion engine having an induction passage, a throttle valve in said induction passage, an exhaust passage, detecting means for detecting the concentration of a constituent of exhaust gases passing through said exhaust passage and providing a detecting output signal dependent thereon, air-fuel mixture supply means for supplying the air-fuel mixture to the induction passage, including an on-off type electromagnetic valve for correcting the air-fuel ratio of the air-fuel mixture supplied by said air-fuel mixture supply means, the improvement comprising a comparing circuit means for comparing the detecting output signal of said detecting means with a reference value corresponding to a stoichiometric air-fuel ratio value and for producing a first output signal dependent on the difference, an integration circuit means responsive to said first output signal for producing an integration output signal, a driving circuit means for producing a driving output for driving said type on-off type electromagnetic valve dependent on the integration output signal of said integration circuit means for controlling the air-fuel ratio to a value approximately equal to the stoichiometric air-fuel ratio, a constant signal generating circuit means for producing a constant signal selectively operating said on-off type electromagnetic valve at a predetermined duty ratio via said driving circuit means, a first switch connecting said integration circuit means with said driving circuit means, a second switch connecting said constant signal generating circuit means with said driving circuit means, means comprising a vacuum switch in said induction passage for sensing only such a high vacuum occurring in a rapid deceleration condition of said engine that would cause misfiring, and a switch actuating circuit means responsive to the output of said vacuum switch for producing a second output signal for opening said first switch and closing said second switch, said first and second switches are operatively connected to said second output signal of said switch actuating circuit means, and inverting means connected between said second output signal of said switch actuating circuit means and one of said switches for opening one of said switches while the other of said switches remains closed and vice versa, respectively, via said second output signal, whereby said driving circuit means is operated by the constant signal from said constant signal generating circuit means for driving said on-off type electromagnetic valve at said predetermined duty ratio.

3. The system as set forth in claim 2, wherein said inverting means comprises an inverting transistor.

4. The system as set forth in claim 1, wherein said vacuum switch closes when said high vacuum occurring in said rapid deceleration condition of said engine occurs.

5. The system as set forth in claim 1, wherein said vacuum switch is disposed downstream of said throttle valve.

6. The system as set forth in claim 1, further comprising a catalytic converter disposed in the exhaust passage downstream of said detecting means.

* * * * *

UNITED STATES PATENT AND TRADEMARK OFFICE
CERTIFICATE OF CORRECTION

PATENT NO. : 4,393,839
DATED : July 19, 1983
INVENTOR(S) : Ryuji Kataoka

It is certified that error appears in the above–identified patent and that said Letters Patent are hereby corrected as shown below:

Column 4, Line 5, Claim 1, "consistent" should read

--constituent--

Signed and Sealed this

First Day of November 1983

[SEAL]

Attest:

GERALD J. MOSSINGHOFF

Attesting Officer

Commissioner of Patents and Trademarks